(12) United States Patent
Niroumand et al.

(10) Patent No.: US 11,545,683 B2
(45) Date of Patent: Jan. 3, 2023

(54) METHODS AND APPARATUS FOR DETECTING ELECTRICAL SHORT CIRCUITS IN FUEL CELL STACKS

(71) Applicant: Greenlight Innovation Corporation, Burnaby (CA)

(72) Inventors: Amir Masoud Niroumand, Burnaby (CA); Michael Hermann Eikerling, Burnaby (CA); Mark Randall Olfert, Delta (CA); Hooman Homayouni, Burnaby (CA)

(73) Assignee: Greenlight Innovation Corporation, Burnaby (CA)

( * ) Notice: Subject to any disclaimer, the term of this patent is extended or adjusted under 35 U.S.C. 154(b) by 937 days.

(21) Appl. No.: 16/381,522

(22) Filed: Apr. 11, 2019

(65) Prior Publication Data
US 2020/0328439 A1  Oct. 15, 2020

(51) Int. Cl.
| | |
|---|---|
| *H01M 8/04537* | (2016.01) |
| *H01M 8/04089* | (2016.01) |
| *H01M 8/1018* | (2016.01) |
| *H01M 8/0444* | (2016.01) |
| *H01M 8/04791* | (2016.01) |
| *G01N 27/26* | (2006.01) |
| *H01M 8/04298* | (2016.01) |

(52) U.S. Cl.
CPC ........ *H01M 8/04559* (2013.01); *G01N 27/26* (2013.01); *H01M 8/0444* (2013.01); *H01M 8/04089* (2013.01); *H01M 8/04791* (2013.01); *H01M 8/1018* (2013.01); *H01M 8/04305* (2013.01)

(58) Field of Classification Search
None
See application file for complete search history.

(56) References Cited

U.S. PATENT DOCUMENTS

| | | | |
|---|---|---|---|
| 6,475,651 B1 | 11/2002 | Wilkinson et al. | |
| 6,638,650 B1 | 10/2003 | Bailey et al. | |
| 6,889,147 B2 | 5/2005 | Gopal et al. | |
| (Continued) | | | |

FOREIGN PATENT DOCUMENTS

WO   2006/096956   9/2006

OTHER PUBLICATIONS

Amir M. Niroumand et al., "In-situ diagnostic tools . . . part II: Operational applications", Journal of Power Sources, 322 (2016) 147-154.

(Continued)

*Primary Examiner* — Carmen V Lyles-Irving
(74) *Attorney, Agent, or Firm* — Clark & Brody LP

(57) ABSTRACT

Methods and apparatus for detecting electrical short circuits in fuel cell stacks are provided. The methods involve supplying a reactant and an inert gas to a fuel cell stack and measuring the open circuit voltage of fuel cell assemblies in the fuel cell stack. The sensitivity of the methods can be adjusted to detect an electrical short circuit having a resistance at or below a particular threshold short-circuit resistance value, by using a suitable reactant concentration in the method. The methods can include determining a set-point reactant concentration that can be used to detect an electrical short circuit having a resistance at or below a particular threshold short-circuit resistance value.

14 Claims, 6 Drawing Sheets

(56) References Cited

U.S. PATENT DOCUMENTS

| | | |
|---|---|---|
| 7,194,367 B2 | 3/2007 | Baker |
| 7,597,977 B2 | 10/2009 | Hamada et al. |
| 2004/0245100 A1* | 12/2004 | Abouatallah ..... H01M 8/04552 |
| | | 204/400 |
| 2005/0064252 A1 | 3/2005 | Kusakabe et al. |
| 2005/0237067 A1 | 10/2005 | Haas et al. |
| 2006/0115693 A1 | 6/2006 | Toth et al. |
| 2014/0239962 A1 | 8/2014 | Oda et al. |

OTHER PUBLICATIONS

D. De Moor et al., "In Situ Quatification of . . . PEM Fuel Cell Stacks" IEE Transactions on Industrial Electronics, vol. 62, No. 8, pp. 5275-5282, Aug. 2015

Amir M. Niroumand et al., "In-situ diagnostic tools . . . part I: R&D applications" Journal of Power Sources 278 (2015) 652-659.

M. V. Williams et al., "Analysis of Polarization . . . Air PEM Fuel Cells" Journal of Electrochemical Society, 152, (3) A635-A644 (2005).

* cited by examiner

METHODS AND APPARATUS FOR DETECTING ELECTRICAL SHORT CIRCUITS IN FUEL CELL STACKS

FIELD OF THE INVENTION

The present invention relates to methods and apparatus for detecting and locating electrical short circuits in solid polymer electrolyte fuel cell stacks.

BACKGROUND OF THE INVENTION

Electrochemical fuel cells convert reactants, namely fuel and oxidant, to generate electric power and reaction products. Electrochemical fuel cells generally employ an electrolyte disposed between two electrodes, namely a cathode and an anode. The electrodes each comprise an electrocatalyst disposed at the interface between the electrolyte and the electrodes to induce the desired electrochemical reactions.

Solid polymer fuel cells (also referred to as polymer electrolyte membrane or PEM fuel cells) employ a solid polymer electrolyte, or ion exchange membrane. The membrane is typically interposed between two electrode layers, forming a membrane electrode assembly ("MEA"). The membrane is typically proton conductive and acts as a gas barrier, isolating the fuel and oxidant streams from each other on opposite sides of the MEA. The MEA is typically interposed between two plates to form an individual fuel cell. The plates act as current collectors, provide support for the adjacent electrodes, and typically contain flow field channels for supplying reactants to the MEA, and in some cases for circulating a coolant. Fuel cell assemblies are typically compressed to ensure good electrical contact between the plates and the electrodes, as well as good sealing between fuel cell components. A plurality of fuel cells may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are commonly referred to as bipolar plates and may have flow channels for directing fuel and oxidant, or a reactant and coolant, on each major surface, respectively.

The fuel stream which is supplied to the anode may be a gas such as, for example, substantially pure gaseous hydrogen or a reformate stream comprising hydrogen and other components, or a liquid such as, for example, aqueous methanol. The oxidant stream, which is supplied to the cathode, typically comprises oxygen supplied as, for example, substantially pure gaseous oxygen or a dilute oxygen stream, such as, for example, air, which may also contain other components such as nitrogen, argon, water vapor, carbon monoxide, and carbon dioxide. Various sealing mechanisms are used to fluidly isolate the fuel and oxidant streams from one another in the fuel cell.

As well as serving as a gas barrier between the anode and cathode, the membrane electrolyte material is also electrically non-conductive (or has a high electrical resistance). If the membrane electrolyte in a fuel cell is intact, typically substantially no electrical current flows from one electrode to the other through the membrane electrolyte. However, electrical short circuits across individual fuel cells can cause damage to the fuel cell and can be a significant cause of early fuel cell stack failure. Manufacturing defects can result in low resistance points between the two electrodes or plates. This can occur, for example, if there are irregularities in the bipolar plates; if the electrode material penetrates the membrane electrolyte; if electrically conductive particles are introduced between the plates during stack assembly; and/or if edge connection occurs between the bipolar plates. The likelihood of short circuits tends to increase when thinner membranes are used (for example, to reduce protonic resistance in fuel cells and increase power density), or when thin metallic bipolar plates that can deform easily are used. Such short circuits result in electron transfer from anode to cathode, and an oxygen reduction reaction can occur between oxygen that is present at the cathode and protons that are conducted through the membrane. This can result in parasitic losses, reduced hydrogen utilization, and a reduction in the efficiency of the fuel cell system.

When a fuel cell with such a short circuit is supplied with reactants, during conditioning or operation, the voltage across the defect can cause a significant amount of current to pass through it, and can result in a hot spot. The localized heat that is generated can burn and cause irreversible damage to the membrane and/or other fuel cell components.

Fuel cells can be checked for short circuits, for example, during quality control testing after manufacture and assembly, during routine maintenance, and/or during testing to evaluate the condition of fuel cells in a fuel cell stack during their lifetime in a product.

One method for detecting electrical short circuits across a fuel cell is to apply a small potential across the anode and cathode and measure the resulting current. When using a potentiostat, the current setting is preferably limited to reduce the chances that current flow through low resistance defects will result in high current, and damage the membrane. In a fuel cell that is substantially free of electrical short circuits, the measured current will be zero or extremely small. If there is a short circuit across the cell, the applied potential will result in measurable or significant current flow. This method is simple and can be used to identify and quantify the magnitude of a short circuit across a fuel cell. However, this method is generally not practical or suitable for detecting and locating short circuits in a fuel cell stack, primarily because most stack cell voltage monitoring (CVM) systems can measure individual cell potentials, but are not suitable for conducting large currents given the small size of the contact probes.

Another technique for detecting short circuits in fuel cells involves supplying hydrogen and nitrogen to the fuel cell anode and cathode, respectively, and performing Linear Sweep Voltammetry (LSV) to detect low resistance across the fuel cell based on the slope of the I-V curve. While LSV is an accurate detection method, it is generally not practical or suitable for detecting and locating short circuits in fuel cell stacks, again primarily because it requires potential control and current supply which is not feasible with conventional CVM systems.

On-going research and development is significantly improving the cost, performance, and durability of fuel cell systems. Advancing from lab scale development towards production scale manufacturing requires important steps to be taken by the fuel cell industry, including (i) design modification of fuel cell systems to make them suitable for mass production; and (ii) development of manufacturing processes suitable for use in mass production; and (iii) the development of associated Quality Control (QC) methodologies for testing individual components as well as assembled fuel cell stacks.

Accordingly, there is a need for a simple and reliable method of detecting electrical short circuits in individual fuel cells, and particularly in fuel cells in situ in a fuel cell stack. Methods that provide a rapid indication of an electrical short circuits and that identify which fuel cells in the fuel cell stack have an electrical short circuit would be particularly desirable.

SUMMARY OF THE INVENTION

In a first aspect of a method for detecting electrical short circuits in a test fuel cell stack, where the test fuel cell stack comprises a plurality of fuel cell assemblies, the method comprises determining a set-point reactant concentration that can be used to detect an electrical short circuit having a resistance at or below a particular or desired threshold short-circuit resistance value. The method then comprises supplying a dilute reactant stream having a reactant concentration at or below the set-point reactant concentration to flow through the plurality of fuel cell assemblies in the test fuel cell stack, and supplying an inert gas to flow through the plurality of fuel cell assemblies in the test fuel cell stack. The method further comprises measuring the open circuit voltage across each of the plurality of fuel cell assemblies in the test fuel cell stack, while the dilute reactant stream having a reactant concentration at or below the set-point reactant concentration and the inert gas are flowing through the plurality of fuel cell assemblies in the test fuel cell stack.

In some embodiments, the method further comprises discriminating any fuel cell assemblies of the plurality of fuel cell assemblies in the test fuel cell stack that have an electrical short circuit with a resistance lower than the desired threshold short-circuit resistance value based on the open circuit voltages measured across each of the plurality of fuel cell assemblies while the dilute reactant stream having a reactant concentration at or below the set-point reactant concentration and the inert gas are flowing through the plurality of fuel cell assemblies in the test fuel cell stack.

In some embodiments, the method can further comprise comparing the open circuit voltages measured for each of the plurality of fuel cell assemblies in the test fuel cell stack with a reference voltage in order to identify which, if any, of the plurality of fuel cell assemblies in the test fuel cell stack has an electrical short circuit. The reference voltage can be, for example, the average of the open circuit voltages measured for each of the plurality of fuel cell assemblies in the test fuel cell stack.

In some embodiments of the above-described methods, the test fuel cell stack comprises a calibration fuel cell assembly having a current path across it. The current path has a resistance approximately equal to the desired threshold short-circuit resistance. In some embodiments, the method further comprises providing the current path across the calibration fuel cell assembly, for example, by connecting a conductor having a resistance approximately equal to the desired threshold short-circuit resistance across it. Determining the set-point reactant concentration can comprise varying the concentration of a dilute reactant stream supplied to flow through the calibration fuel cell assembly and the plurality of fuel cell assemblies in the test fuel cell stack, and supplying an inert gas to flow through the calibration fuel cell assembly and the plurality of fuel cell assemblies in the test fuel cell stack. The method can comprise measuring the open circuit voltage across the calibration fuel cell assembly and across each of the plurality of fuel cell assemblies in the test fuel cell stack while the dilute reactant stream and the inert gas are being supplied. The concentration of the dilute reactant stream is varied at least until the set-point reactant concentration is reached, the set-point reactant concentration being a reactant concentration at and below which the measured open circuit voltage of the calibration fuel cell assembly is sufficiently differentiated from the measured open circuit voltages of the plurality of fuel cell assemblies in the test fuel cell stack. For example, in some embodiments the set-point reactant concentration is a reactant concentration at and below which a measured open circuit voltage of the calibration fuel cell assembly is sufficiently differentiated from the measured open circuit voltages of the plurality of fuel cell assemblies in the test fuel cell stack by differing from the average of the open circuit voltages of the plurality of fuel cells in the test fuel cell stack measured at the set-point reactant concentration by more than a threshold amount or percentage.

In other embodiments of the above-described method, determining the set-point reactant concentration comprises supplying a dilute reactant stream and an inert gas to flow through a calibration fuel cell assembly, the calibration fuel cell assembly having a current path across it. The current path has a resistance approximately equal to the desired threshold short-circuit resistance. In some embodiments, the method comprises providing the current path across the calibration fuel cell assembly, for example, by connecting a conductor having a resistance approximately equal to the desired threshold short-circuit resistance across it. The method further comprises varying the concentration of the dilute reactant steam supplied to flow through the calibration fuel cell assembly, until the set-point reactant concentration is reached, the set-point reactant concentration reactant being a reactant concentration at and below which the measured open circuit voltage of the calibration fuel cell assembly is sufficiently differentiated from a normal open circuit voltage. In some embodiments the calibration fuel cell assembly is one of the plurality of fuel cell assemblies in the test fuel cell stack.

In still further embodiments of the above-described method, the set-point reactant concentration is determined using a calibration fuel cell stack comprising a plurality of fuel cell assemblies and a calibration fuel cell assembly. The calibration fuel cell assembly has a current path across it. The current path has a resistance approximately equal to the desired threshold short-circuit resistance. In some embodiments, the method comprises providing the current path across the calibration fuel cell assembly, for example, by connecting a conductor having a resistance approximately equal to the desired threshold short-circuit resistance across it. Determining the set-point reactant concentration comprises varying the concentration of a dilute reactant stream supplied to flow through the calibration fuel cell assembly and the plurality of fuel cell assemblies in the calibration fuel cell stack, and supplying an inert gas to flow through the calibration fuel cell assembly and the plurality of fuel cell assemblies in the calibration fuel cell stack. Determining the set-point reactant concentration further comprises measuring the open circuit voltage across the calibration fuel cell assembly and across each of the plurality of fuel cell assemblies in the calibration fuel cell stack, while the dilute reactant stream and the inert gas are being supplied. The concentration of the dilute reactant stream is varied at least until the set-point reactant concentration is reached, the set-point reactant concentration being a reactant concentration at and below which the measured open circuit voltage of the calibration fuel cell assembly is sufficiently differentiated from the measured open circuit voltages of the plurality of fuel cell assemblies in the calibration fuel cell stack. For example, in some embodiments the set-point reactant concentration is a reactant concentration at and below which a measured open circuit voltage of the calibration fuel cell assembly is sufficiently differentiated from the measured open circuit voltages of the plurality of fuel cell assemblies in the calibration fuel cell stack by differing from the average of the open circuit voltages of the plurality of fuel cells in the calibration fuel cell stack measured at the set-point reactant concentration by more than a threshold amount or percentage.

In some embodiments of a method for detecting electrical short circuits in a fuel cell stack, where the fuel cell stack comprises a plurality of fuel cell assemblies, the method comprises supplying a dilute reactant stream having a reactant concentration at or below a set-point reactant concentration to flow through the plurality of fuel cell assemblies in the fuel cell stack, and supplying an inert gas to flow through the plurality of fuel cell assemblies in the fuel cell stack. The method further comprises measuring the open circuit voltage across each of the plurality of fuel cell assemblies in the fuel cell stack, while the dilute reactant stream having a reactant concentration at or below the set-point reactant concentration and the inert gas are flowing through the plurality of fuel cell assemblies in the fuel cell stack. The set-point reactant concentration is a reactant concentration that can be used to detect an electrical short circuit having a resistance at or below a particular or desired threshold short-circuit resistance value. The method can comprise providing or selecting a suitable or pre-determined set-point reactant concentration.

Some embodiments of the above-described methods further comprise generating an output signal identifying fuel cell assemblies that have an electrical short circuit with a resistance lower than the desired threshold short-circuit resistance value based on the open circuit voltages measured while the dilute reactant stream having a reactant concentration at or below the set-point reactant concentration and the inert gas are flowing through them.

In another aspect of a method for detecting electrical short circuits in a fuel cell stack, the fuel cell stack comprising a plurality of fuel cell assemblies, the method comprises:

measuring a first open circuit voltage across each of the plurality of fuel cell assemblies while supplying a dilute reactant stream having a first concentration of reactant to flow through the plurality of fuel cell assemblies and supplying an inert gas to flow through the plurality of fuel cell assemblies in the fuel cell stack; and measuring a second open circuit voltage across each of the plurality of fuel cell assemblies while supplying a dilute reactant stream having a second concentration of reactant (different from the first concentration of reactant) to flow through the plurality of fuel cell assemblies and supplying an inert gas to flow through the plurality of fuel cell assemblies in the fuel cell stack; and for each of the plurality of fuel cell assemblies comparing the first open circuit voltage with the second open circuit voltage and identifying which, if any, of the plurality of fuel cell assemblies has an electrical short circuit based on the difference between the first open circuit voltage and the second open circuit voltage. For example, identifying which, if any, of the plurality of fuel cell assemblies has an electrical short circuit can be based on the difference between the first open circuit voltage and the second open circuit voltage being greater than a threshold voltage difference.

In any of the above-described methods, the various fuel cell assemblies (including the calibration fuel cell assemblies) can comprise an anode, a cathode and a membrane electrolyte interposed between the anode and cathode. In some embodiments of the above-described methods, the dilute reactant stream is a dilute hydrogen stream, and determining a set-point reactant concentration that can be used to detect an electrical short circuit having a resistance at or below a desired threshold short-circuit resistance value comprises determining a set-point hydrogen concentration; supplying a dilute reactant stream to flow through the various fuel cell assemblies comprises supplying the dilute hydrogen stream to the anodes of the fuel cell assemblies; and supplying an inert gas to flow through the various fuel cell assemblies comprises supplying the inert gas stream to the cathodes of the fuel cell assemblies. In some embodiments, the inert gas is selected from the group consisting of nitrogen, argon, and helium. In some embodiments, the inert gas is nitrogen.

In some embodiments of the above-described methods, the dilute reactant stream is supplied to flow through the fuel cell assemblies at a first pressure, and the inert gas is supplied to flow through the fuel cell assemblies at second pressure. In some embodiments of the methods, the first pressure and the second pressure are substantially the same pressure.

A fuel cell test station can be configured to perform any of the above-described methods.

A supervisory control and data acquisition system can be configured to perform any of the above-described methods. The system can comprise a cell voltage monitoring subsystem for measuring the voltage across each of a plurality of fuel cell assemblies, and a controller.

In some embodiments, a supervisory control and data acquisition system comprises a cell voltage monitoring subsystem for measuring the voltage across each of a first plurality of fuel cell assemblies and across a calibration fuel cell assembly. In some embodiments the first plurality of fuel cell assemblies and the calibration fuel cell assembly are fuel cell assemblies in a calibration fuel cell stack. The calibration fuel cell assembly has a known desired threshold short-circuit resistance across it. The system further comprises a controller communicatively coupled to the cell voltage monitoring subsystem. The controller is configured to cause a dilute reactant stream to flow through the calibration fuel cell assembly and through the first plurality of fuel cell assemblies, and to vary the concentration of the dilute reactant stream, and to cause an inert gas to flow through the calibration fuel cell assembly and the first plurality of fuel cell assemblies. The controller is also configured to cause the cell voltage monitoring subsystem to measure the open circuit voltage across the calibration fuel cell assembly and across each of the first plurality of fuel cell assemblies while the dilute reactant stream and the inert gas are flowing through the calibration fuel cell assembly and the first plurality of fuel cell assemblies. The supervisory control and data acquisition system is configured to:

determine, based on the open circuit voltages measured across the calibration fuel cell assembly and across each of the first plurality of fuel cell assemblies, a set-point reactant concentration that can be used to detect an electrical short circuit in a fuel cell assembly having a resistance at or below the desired threshold short-circuit resistance value, the set-point reactant concentration being the reactant concentration of the dilute reactant stream at and below which the measured open circuit voltage of the calibration fuel cell assembly is sufficiently differentiated from the measured open circuit voltages of the first plurality of fuel cell assemblies. The supervisory control and data acquisition system is configured to:

compare the open circuit voltages of the first plurality of fuel cell assemblies measured while the dilute reactant stream having a reactant concentration at or below the set-point reactant concentration and the inert gas are flowing through the first plurality of fuel cell assemblies with a reference voltage in order to identify which, if any, of the first plurality of fuel cell assemblies has an electrical short circuit; and/or to:

compare the open circuit voltages of a second plurality of fuel cell assemblies in a test fuel cell stack measured while the dilute reactant stream having a reactant concentration at or below the set-point reactant concentration and the inert gas are flowing through the second plurality of fuel cell assemblies with a reference voltage in order to identify which, if any, of the second plurality of fuel cell assemblies in the test fuel cell stack has an electrical short circuit.

The reference voltage can be, for example, the average of the open circuit voltages measured for each of the first or second plurality of fuel cell assemblies, while the dilute reactant stream having a reactant concentration at or below the set-point reactant concentration and the inert gas are flowing through the respective first or second plurality of fuel cell assemblies.

In some embodiments, the supervisory control and data acquisition system is further configured to generate an output signal identifying any fuel cell assemblies of the first and/or second plurality of fuel cell assemblies that have an electrical short circuit with a resistance lower than the desired threshold short-circuit resistance value based on the open circuit voltage measured across each of the respective first or second plurality of fuel cell assemblies while the dilute reactant stream having a reactant concentration at or below the set-point reactant concentration and the inert gas are flowing through the respective first or second plurality of fuel cell assemblies.

A non-transitory computer readable medium can have encoded thereon computer program code that is executable by a processor and that, when executed by the processor causes the processor to perform certain acts or elements of the above-described methods. For example, the computer program code can be executable to cause the processor to determine a set-point reactant concentration that can be used to detect an electrical short circuit in a fuel cell assembly having a resistance at or below a desired threshold short-circuit resistance value; and/or to identify fuel cell assemblies that have an electrical short circuit with a resistance lower than the desired threshold short-circuit resistance value based on an open circuit voltage measured across each of the fuel cell assemblies while a dilute reactant stream having a reactant concentration at or below the set-point reactant concentration and an inert gas stream are supplied to flow through the fuel cell assemblies.

In some embodiments, a non-transitory computer readable medium has encoded thereon computer program code that is executable by a processor and that, when executed by the processor causes the processor to determine, based on open circuit voltages measured across a calibration fuel cell assembly having a known desired threshold short-circuit resistance across it and measured across each of a first plurality of fuel cell assemblies while a dilute reactant stream having a variable reactant concentration and an inert gas are flowing through the calibration fuel cell assembly and the first plurality of fuel cell assemblies, a set-point reactant concentration that can be used to detect an electrical short circuit in a fuel cell assembly having a resistance at or below a desired threshold short-circuit resistance value, the set-point reactant concentration being the reactant concentration of the dilute reactant stream at and below which the measured open circuit voltage of the calibration fuel cell assembly is sufficiently differentiated from the measured open circuit voltages of the first plurality of fuel cell assemblies. The computer program code when executed by the processor can further cause the processor to:

compare the open circuit voltages of the first plurality of fuel cell assemblies measured while the dilute reactant stream having a reactant concentration at or below the set-point reactant concentration and the inert gas are flowing through the first plurality of fuel cell assemblies with a reference voltage in order to identify which, if any, of the first plurality of fuel cell assemblies has an electrical short circuit; and/or to:

compare the open circuit voltages of a second plurality of fuel cell assemblies in a test fuel cell stack measured while the dilute reactant stream having a reactant concentration at or below the set-point reactant concentration and the inert gas are flowing through the second plurality of fuel cell assemblies with a reference voltage in order to identify which, if any, of the second plurality of fuel cell assemblies in the test fuel cell stack has an electrical short circuit.

The reference voltage can be, for example, the average of the open circuit voltages measured for each of the first or second plurality of fuel cell assemblies while the dilute reactant stream having a reactant concentration at or below the set-point reactant concentration and the inert gas are flowing through the first or second plurality of fuel cell assemblies respectively.

In some embodiments of the above described methods and apparatus, the fuel cells in the fuel cell assemblies and/or fuel cell stacks are electrically connected in series.

In some embodiments of the above described methods and apparatus, the calibration fuel cell assembly can be a single cell or a group of fuel cells.

A fuel cell assembly, as referred to herein can be a single fuel cell or a group of fuel cells.

This summary does not necessarily describe the entire scope of all aspects. Other aspects, features, and advantages will be apparent to those of ordinary skill in the art upon review of the following description of specific embodiments.

DETAILED DESCRIPTION OF PREFERRED EMBODIMENT(S)

Figure 1:
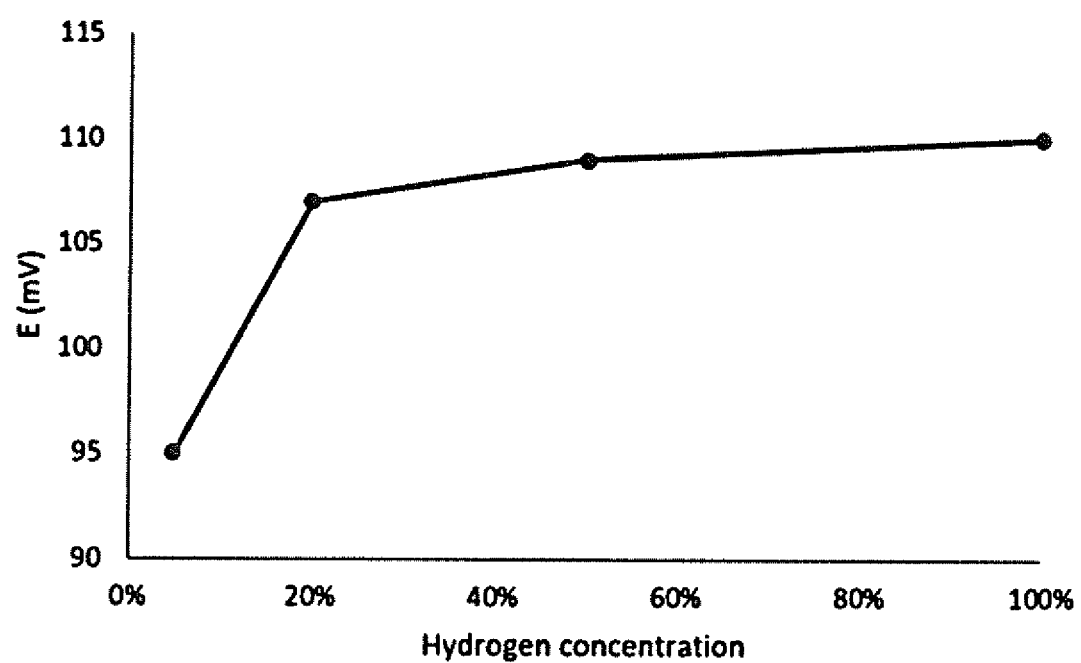
FIG. 1 illustrates the effect of hydrogen concentration on the open circuit voltage measured across a fuel cell having a simulated electrical short circuit.

As used in this description and in the appended claims, "fuel" means a substantially pure hydrogen gas stream or a gas stream comprising hydrogen, such as a reformate gas stream, for example, and "oxidant" means a substantially pure oxygen gas stream or a gas stream comprising oxygen, such as air, for example.

"Inert gas" means a gas stream that is substantially unreactive in a fuel cell, such as nitrogen, argon, or helium, or any combination thereof, for example.

"Reactant" is used to refer to a material that is reactive in a fuel cell, such as hydrogen or oxygen, for example.

An "electrical short circuit" is used to refer to an electrical circuit that allows an electric current to travel along an unintended path, for example between two nodes of an electric circuit that are intended to be at different voltages. In particular, in this description and appended claims, the term is used primarily to refer to an unintended electron-conducting path between the anode and cathode of an individual fuel cell.

A "transfer leak" is used to refer to a condition where reactants may mix with each other or with coolant within a fuel cell assembly during normal operation due to a defect in membrane, an MEA, flow field plate, and/or the seals therebetween. This includes a leak between the anode side and the cathode side which can cause fuel and oxidant to mix. Typical sources of transfer leaks include, for example, a pin-hole in the membrane electrolyte or a cracked fuel-oxidant bipolar flow field plate.

Open circuit voltage ("OCV") is used to refer to the voltage across a fuel cell assembly when a first reactant is supplied to the anode side and a second reactant is supplied to the cathode side of a fuel cell assembly, or when a first reactant is supplied to the anode or cathode side and an inert gas is supplied to the other side of a fuel cell assembly, but no external electrical load is connected to the fuel cell assembly.

The present method and apparatus allow solid polymer fuel cells in a fuel cell stack to be checked for electrical short circuits, for example, after stack assembly or during routine testing or maintenance. Embodiments of the methods described herein for detecting electrical leaks in a fuel cell stack use gases and hardware that are typically readily available in fuel cell testing systems, such as on commercially available fuel cell test stations. The methods can use cell voltage monitoring (CVM) hardware that is typically available on fuel cell test stations, to detect electrical shorts in fuel cell assemblies in a fuel cell stack.

When hydrogen and air are supplied to the anode and cathode of a solid polymer fuel cell, respectively, it results in an OCV of around ~1 V between the two electrodes and respective bipolar plates. If an electrical short circuit (low resistance path) exists between the two electrodes or bipolar plates, current will pass through it. If oxygen is present at the cathode, electron transfer from anode to cathode can cause an oxygen reduction reaction to occur at the cathode between the oxygen, and protons that have been conducted through the membrane. The magnitude of the current depends on the conductance of the electrical short circuit. If the current flowing is relatively high and is passing through a current path with a small surface area, it can result in a hotspot, and the heat that is generated can damage the membrane or MEA and cause the fuel cell to fail. In order to mitigate the risk of this occurring during testing for short circuits, it is desirable to reduce the cell potential so that the current is smaller, and less heat is produced. It is also desirable to use an inert gas on one side (typically the cathode side) in order to reduce the possibility of fuel and oxidant mixing if the short circuit does result in a transfer leak through the membrane.

In some embodiments of a method for detecting an electrical short circuit in a fuel cell, hydrogen and nitrogen (or another inert gas) are supplied to the anode and cathode sides of the fuel cell, respectively, and the individual cell OCVs are measured. This approach typically reduces the OCV by an order of magnitude, relative to when hydrogen and air are supplied, and eliminates the use of oxygen from the testing procedure. If there is substantially no oxygen present at the cathode, an electrical short circuit can result in some hydrogen production at the cathode: protons that have passed through the membrane electrolyte can recombine with electrons that have been conducted via the short circuit to produce hydrogen at the cathode. When hydrogen and nitrogen are supplied to the anode and cathode sides of a plurality of fuel cells, fuel cells that have one or more electrical short circuits have been found, under certain conditions, to have a lower OCV relative to similar or identical cells that have substantially no short circuit across them. For example, when an electrical path with known conductance was connected between the anode and cathode bipolar plates of a single fuel cell (in order to simulate an electrical short circuit across the cell), and a hydrogen-containing gas stream was supplied to the anode and nitrogen to the cathode, it was found that the OCV was dependent on the conductance of the electrical path (higher conductance—lower OCV).

Furthermore, it has been found that as the concentration of hydrogen supplied to the anode is reduced, the effect of a short circuit on fuel cell OCV is magnified. This allows the sensitivity of the test method to be adjusted. For example, the hydrogen concentration can be selected so that a short circuit having a conductance at or above a desired threshold can be detected for a given MEA, fuel cell architecture, and active area.

To illustrate this, a $10\Omega$ resistance was connected in parallel across a single fuel cell to simulate an electrical short circuit, and a hydrogen-containing gas stream was supplied to the anode and nitrogen was supplied to the cathode. The hydrogen concentration was reduced (by diluting it with nitrogen) and the OCV across the fuel cell was measured at various hydrogen concentrations. FIG. 1 shows the effect of hydrogen concentration on the OCV measured across the fuel cell. It can be seen in FIG. 1 that the OCV (shown as E in mV) drops a small amount as the hydrogen concentration is reduced from 100% to 50% and to 20%, then drops steeply (by about 15%) as the hydrogen is reduced to 5%. Thus, using a lower hydrogen concentration, for example 5% in this case, can make a short circuit much more readily detectable based on a measuring the fuel cell OCV.

The sensitivity of the test method to reveal or identify a short circuit can depend at least in part on the size of the fuel cell active area as well as on the conductance (or resistance) of the electrical short circuit(s). When short circuits with lower conductance (higher resistance) or short circuits for fuel cells with a large active area need to be detected, the method can be made more sensitive by reducing the concentration of hydrogen supplied to the anode side. This can be accomplished, for example, by diluting the hydrogen with nitrogen.

Another option is to take OCV measurements at two (or more) different hydrogen concentrations. In this case, the OCV of fuel cells with an electrical short circuit will exhibit a larger change in OCV as the hydrogen concentration is decreased, compared to fuel cells without a short circuit where the OCV will be approximately the same at different hydrogen concentrations.

Embodiments of the methods described herein can allow in situ detection of electrical leaks in individual cells in a fuel cell stack before they cause burns or visible damage.

TABLE 1 shows the result of testing a 2-cell fuel cell stack for electrical short circuits. The active area of the cells was 50 cm$^2$, and the test was conducted at 22° C. and 100 kPa pressure at anode and cathode. The gases were supplied without humidification. The results shown in the first row of TABLE 1 show the OCV measured for each individual fuel cell (cells C1 and C2) when substantially pure hydrogen is supplied to the anodes and nitrogen is supplied to the cathodes, prior to adding any external electrically conductive path across either of the cells to simulate a short circuit. In this case, the measured OCV for the cells was within a 2 mV range. The second row shows the fuel cell OCVs, when a 1.5 Ω resistance was connected across cell C1 (to simulate a substantial short circuit), and when substantially pure hydrogen was supplied to the anodes and nitrogen was supplied to the cathodes. The OCV for cell C1 dropped by 16 mV upon connecting the 1.5Ω resistance so, by looking at the data in the second row, it is possible to identify cell C1 as having an electrical short circuit. The third row shows the cell OCVs, when a 10.5Ω resistance was connected across cell C1 (simulating a less significant electrical short circuit)—again with substantially pure hydrogen supplied to the anodes and nitrogen supplied to the cathodes. This simulated short circuit, having a resistance of 10.5Ω, was not detectable based on the observed OCV values under these conditions—the cell potential for cell C1 was within 1 mV of the cell potential for C2. The fourth row of TABLE 1 shows the measured cell OCVs when a 10.5Ω resistance was connected across cell C1, and when the concentration of hydrogen supplied to the anodes was reduced to 10%. In this case, the 10.5Ω resistance connected across cell C1 to simulate a short circuit can be readily detected. Under these conditions the OCV for cell C1 deviates significantly from the cell OCV for cell C2 which has no external electrically conductive path connected across it to simulate a short circuit. Thus, reducing the hydrogen concentration increased the sensitivity of the method to differentiate fuel cells that have an electrical short circuit from those that do not. Thus, when hydrogen is supplied at or below a certain concentration, it is possible to detect fuel cells with an electrical short circuit by a single measurement based on their lower OCV.

TABLE 1

| [H$_2$] | Added R Ω | Cell # | C1 OCV | C2 OCV |
| --- | --- | --- | --- | --- |
| 100% | — | Both | 101 mV | 99 mV |
| 100% | 1.5 | C1 | 85 mV | 100 mV |
| 100% | 10.5 | C1 | 100 mV | 99 mV |
| 10% | 10.5 | C1 | 79 mV | 91 mV |

Figure 2:
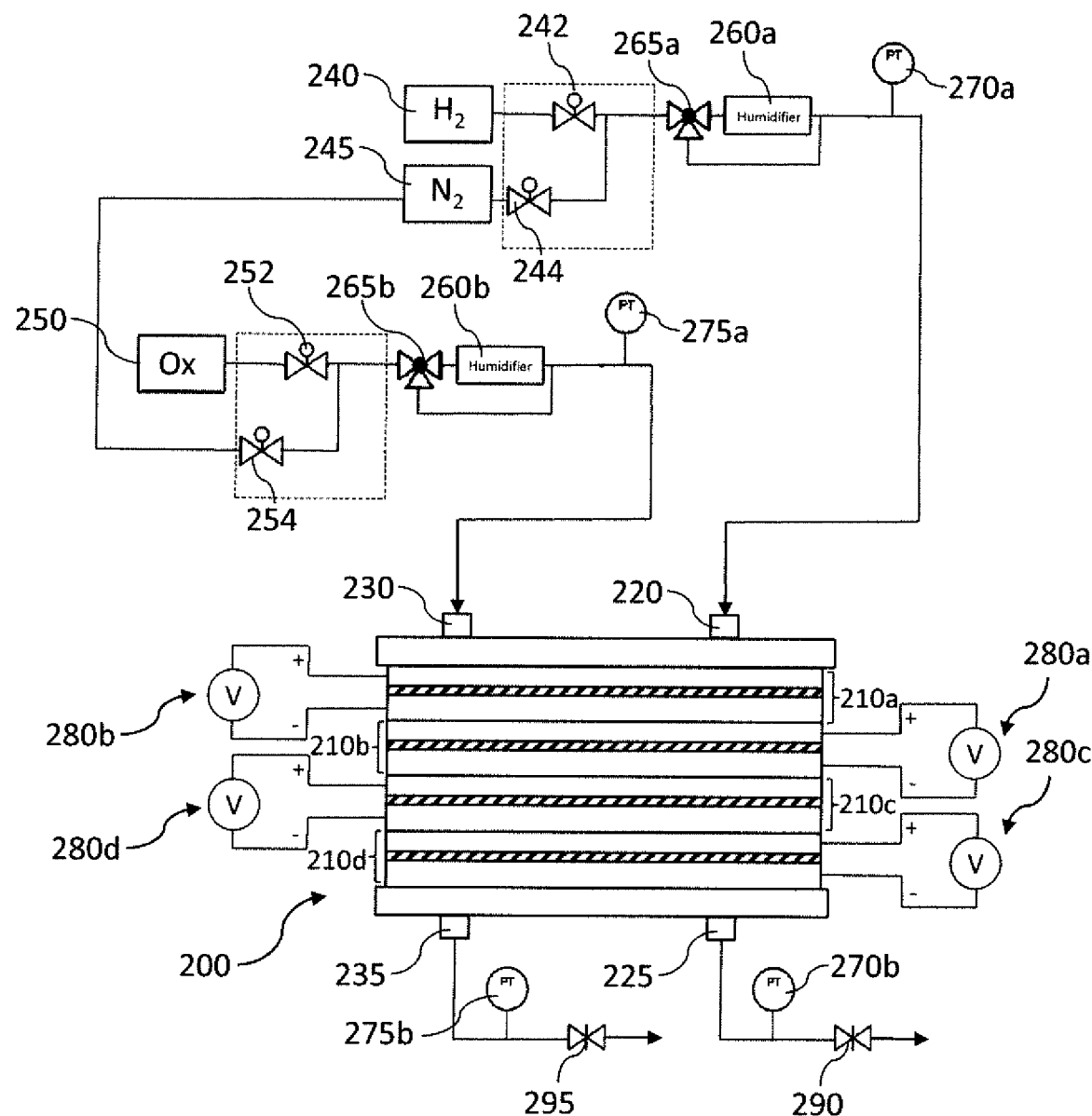
FIG. 2 is a schematic illustration of an example of fuel cell test station equipment that can be used to perform embodiments of the test methods described herein to detect electrical short circuits in fuel cell assemblies and stacks.

FIG. 2 is a schematic illustration of an example of fuel cell test station equipment that can be used to perform embodiments of the test methods described herein. FIG. 2 shows a fuel cell stack 200 connected to equipment for testing of the fuel cell stack. Fuel cell stack 200 comprises four fuel cell assemblies 210a, 210b, 210c and 210d, each comprising an anode side, a cathode side, and a membrane electrolyte (shown with shading) therebetween. The anode side can comprise an anode electrode typically comprising a porous gas diffusion layer (GDL) and an anode electrocatalyst layer between the GDL and the membrane electrolyte. Similarly, the cathode side can comprise a cathode electrode typically comprising a porous gas diffusion layer (GDL) and a cathode electrocatalyst layer between the GDL and the membrane electrolyte. There is typically a flow field plate adjacent each of the anode and cathode GDLs for directing reactant streams to the anode and cathode respectively. In some fuel cell stacks the flow field plate between adjacent anode-cathode pairs is a single bipolar plate with anode flow field channels on one side and cathode flow field channels on the other side, and in some cases a coolant flow field in between (e.g. inside the plate). Fuel cell stack also comprises an anode inlet port 220 and anode outlet port 225, a cathode inlet port 230 and a cathode outlet port 235.

Anode inlet port 220 is connected to a source of hydrogen 240 and a source of nitrogen 245 via mass flow controllers (MFCs) 242 and 244 respectively. MFCs 242 and 244 allow for mixing of the gases and reducing the concentration of hydrogen supplied to fuel cell stack 200, as desired.

Cathode inlet port 230 is connected to a source of oxidant 250 (e.g. an oxygen source, or air supplied via an air compressor) and nitrogen source 245 via MFCs 252 and 254 respectively. MFCs 252 and 254 allow for mixing of the gases, or allow the cathode supply to be switched entirely from an oxidant gas to an inert gas (nitrogen in the illustrated embodiment).

Humidifiers 260a and 260b are optional, but can be used to control the humidity of the gases supplied fuel cell stack 200. FIG. 2 shows a three-way bypass vale 265a upstream of anode-side humidifier 260a. In some embodiments, due to the volume of the humidifier, changes in concentration can take a long time to settle to a new steady state at the fuel cell level. Using bypass valve 265a to bypass humidifier 260a and supply the fuel cell stack with a dry hydrogen-containing gas stream can allow for a more rapid change of concentration of the hydrogen-containing gas stream reaching the anodes. It has been found that the methods described herein for testing for fuel cell short circuits are typically not particularly sensitive to humidification levels. Similarly, three-way bypass valve 265b can be used to bypass cathode-side humidifier 260b if desired. A cooling subsystem (not shown) comprising a coolant loop can be operated circulate coolant through fuel cell stack to control stack temperature during testing, if desired.

Pressure and temperature sensors 270a and 270b are used to monitor temperature and pressure at the anode inlet and outlet, respectively. Pressure and temperature sensors 275a and 275b are used to monitor temperature and pressure at the cathode inlet and outlet, respectively.

Voltmeters 280a, 280b, 280c and 280d are used to monitor or measure the voltage across fuel cell assemblies 210a, 210b, 210c and 210d respectively. The voltmeters can be part of a cell voltage monitoring system, which is a typical component of a conventional fuel cell test station.

Back pressure valves 290 and 295 can be used to control the pressure at the anode and cathode, respectively.

Figure 3:
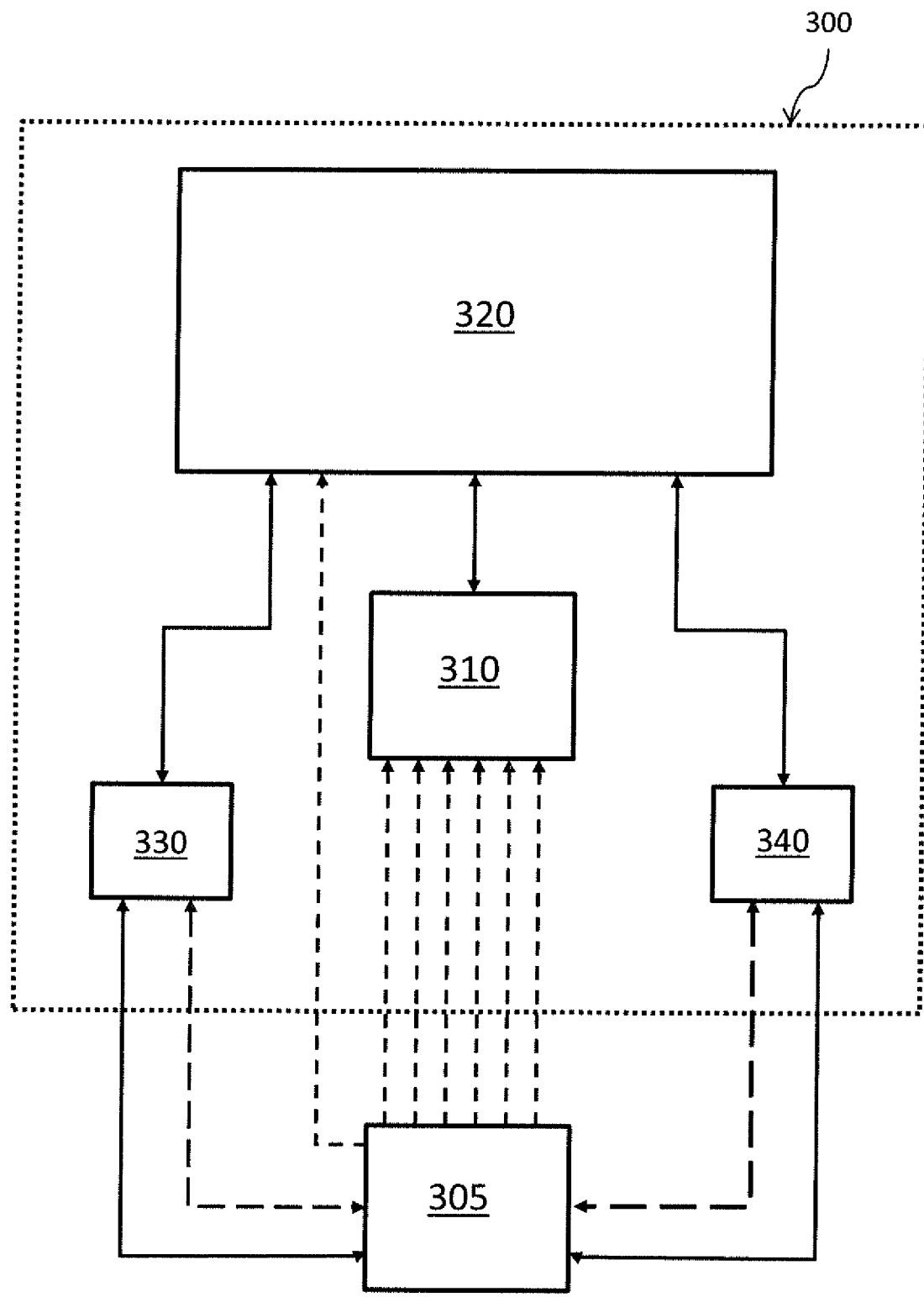
FIG. 3 is a schematic illustration of an embodiment of a fuel cell test system that can be used to perform the methods described herein to detect electrical short circuits in fuel cell assemblies and stacks.

FIG. 3 is a simplified schematic diagram of an embodiment of a system 300 that can be used to perform the methods described herein, in particular, to detect and locate short circuits in fuel cells in a fuel cell stack 305. In FIG. 3, the long-dashed lines indicate process stream connections, the solid lines indicate measurement and control lines, and the short-dashed lines indicate measurement lines.

System 300 comprises a cell voltage monitoring subsystem 310, and a system controller, which in the illustrated embodiment is a supervisory control and data acquisition (SCADA) system 320. Cell voltage monitoring subsystem 310 can be used to measure the voltage of fuel cell assemblies (individual fuel cells or groups of fuel cells), in fuel cell stack 305. Various other subsystems of system 300 are connected to fuel cell stack 305, including, for example, gas supply subsystem 330 that handles the supply of gases (e.g. hydrogen and nitrogen) to the anode and cathode sides of fuel cell stack 305 under controlled conditions (e.g. flow rate, pressure, temperature, humidity etc.), and a thermal management subsystem 340 for regulating the temperature of fuel cell stack 305, for example, by handling supply of a coolant to fuel cell stack 305. Gas supply subsystem 330, for example, can comprise various mass flow controllers, valves, bypass valves, back pressure controllers, mixing devices, humidifiers, and pressure and temperature sensors, such as for example, those illustrated in FIG. 2 in the supply lines for gases to both the anode and cathode sides of a fuel cell stack.

SCADA system 320 is connected and configured to control operation of subsystems 330 and 340, and also to control operation of cell voltage monitoring subsystem 310. SCADA system 320 can also receive data from sensors and other devices in subsystems 330 and 340, and from cell voltage monitoring subsystem 310. For example, SCADA system 320 can include a computer (e.g. a PC) running LabVIEW®-based software which communicates with IO hardware, instruments and sensors using software and control algorithms to control cell voltage monitoring subsystem 310 and subsystems 330 and 340, and to monitor fuel cell stack 305. Parameters controlled by SCADA system 320 may include, gas composition/concentration, anode/cathode pressures, dew point temperatures, gas inlet temperatures and flow rates, and/or fuel cell stack temperature, for example. Parameters that are measured or monitoring during testing of fuel cell stack 305 may include the controlled parameters (which are monitored or measured via suitable sensors and monitoring devices, for example) as well as cell voltages via cell voltage monitoring subsystem 310.

SCADA system 320 can be equipped to perform mathematical calculations and/or data analysis in real time. In some embodiments this is achieved, for example, by interfacing a LabVIEW®-based software module with MATLAB®. In this case, the LabVIEW®-based software module can collect data and control the subsystems, and the data can be passed to MATLAB® for further post processing, calculations and data/results output.

In the depicted embodiment, the system controller 320 comprises a processor that is communicatively coupled to a non-transitory computer readable medium. Computer program code that is executable by the processor can be stored on the computer readable medium. When executed by the processor, the computer program code can cause the processor (and consequently, the system controller) to perform any one or more of the embodiments of the methods described herein.

In other embodiments the system controller may comprise one or more programmable logic controllers (PLCs), real-time embedded controllers (such as, for example, National Instruments CompactRIO™ platform), digital signal processors, field programmable gate arrays, or application-specific integrated circuits, which can take on aspects of the supervisory control of the system. One or more computers (e.g. PCs) can still be used to provide user interface and data acquisition capabilities. Examples of the computer readable medium are non-transitory and comprise disc-based media such as CD-ROMs and DVDs, magnetic media such as hard drives and other forms of magnetic disk storage, and semiconductor based media such as flash media, random access memory, and read only memory.

Figure 4:
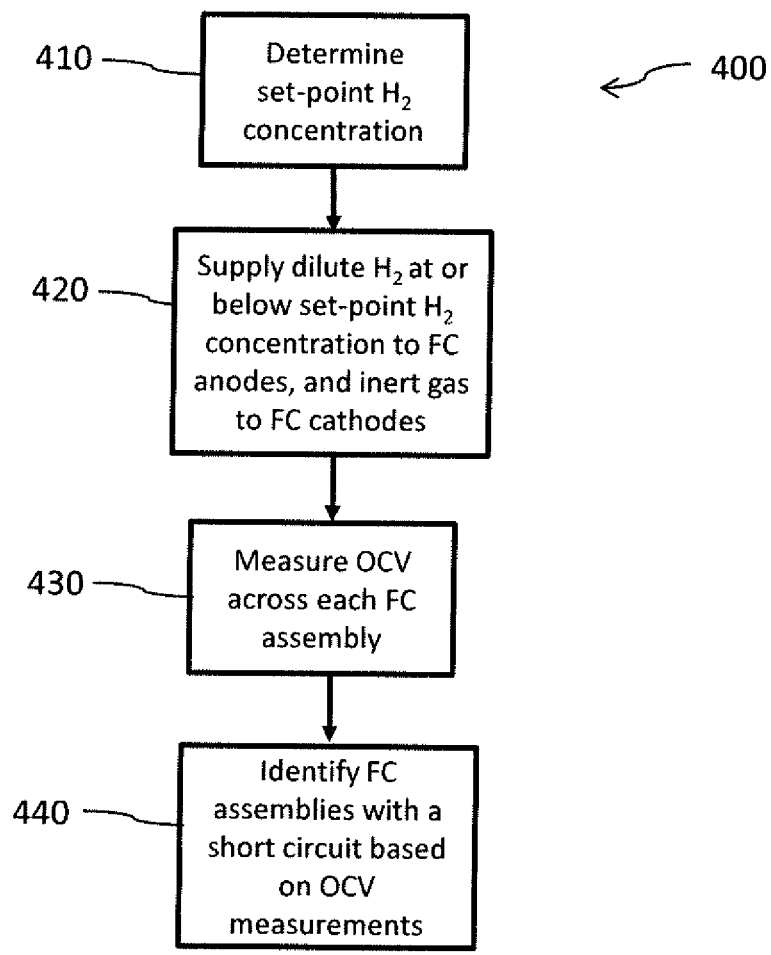
FIG. 4 is a flow chart illustrating an embodiment of a method that can be used to detect electrical short circuits in fuel cell assemblies and stacks.
Figure 5:
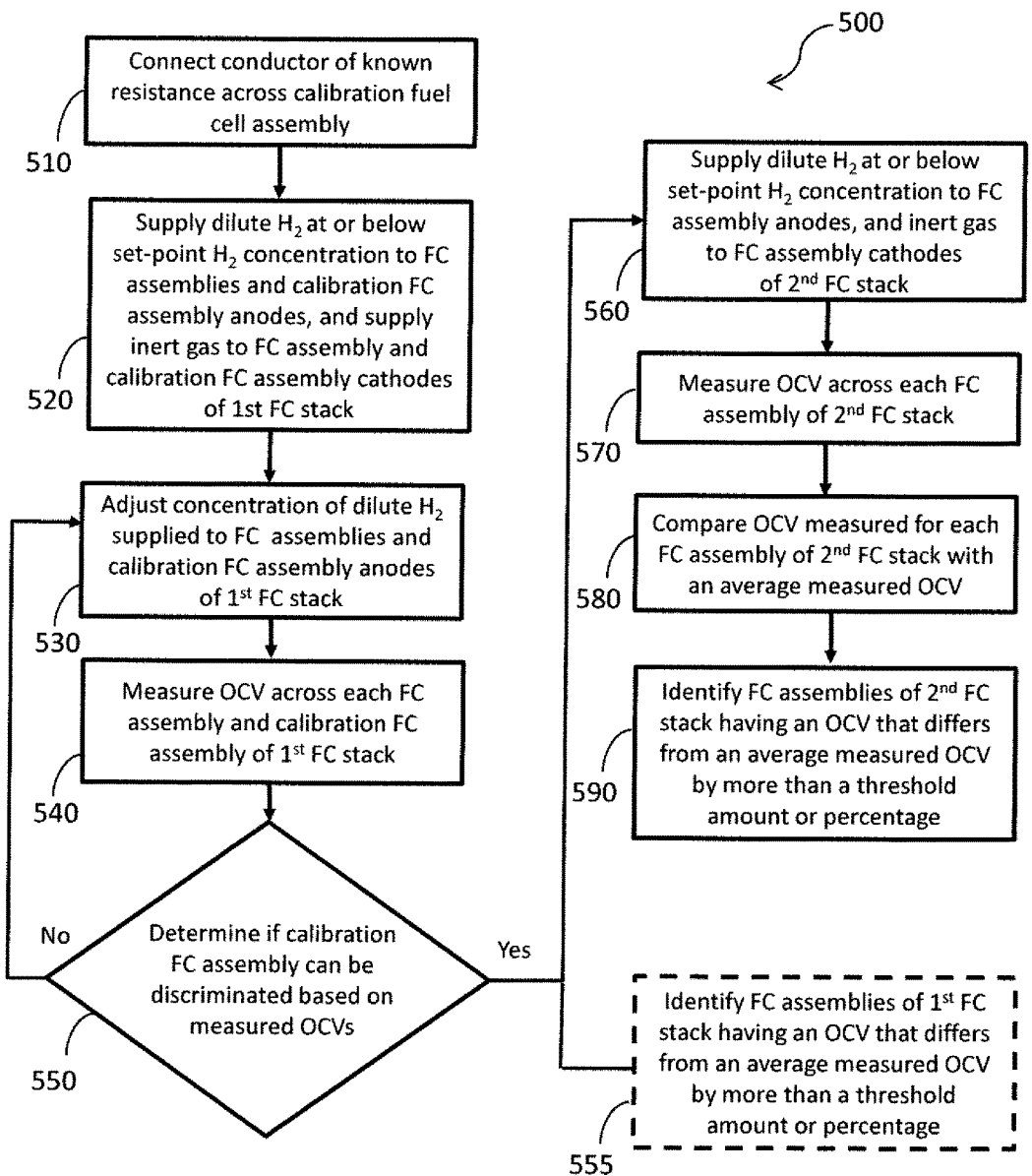
FIG. 5 is a flow chart illustrating another embodiment of a method that can be used to detect electrical short circuits in fuel cell assemblies and stacks.
Figure 6:
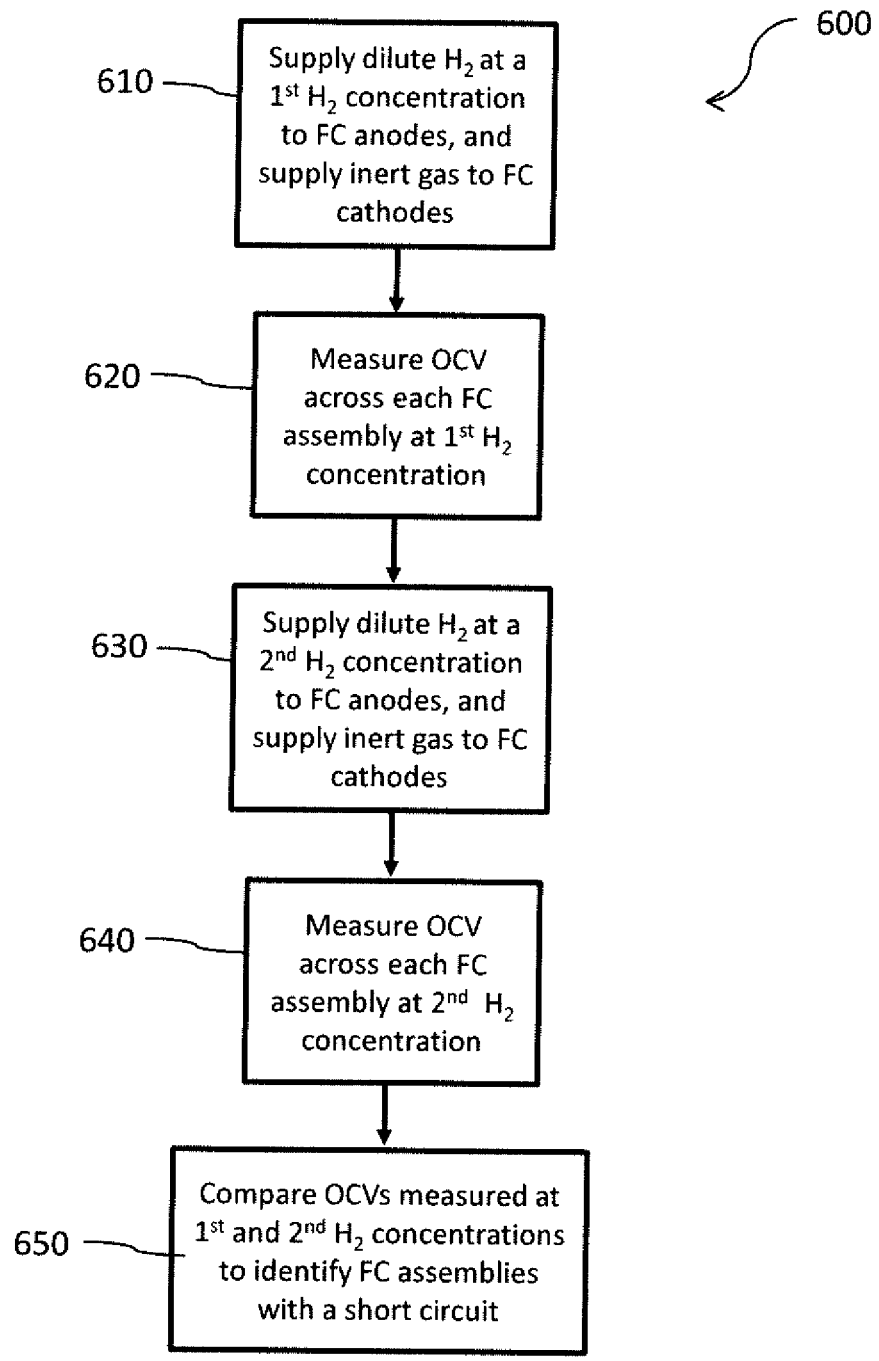
FIG. 6 is a flow chart illustrating another embodiment of a method that can be used to detect electrical short circuits in fuel cell assemblies and stacks.

Some example embodiments of methods for detecting electrical short circuits in fuel cell stacks are illustrated in FIGS. 4, 5 and 6.

FIG. 4 is a flow chart illustrating an embodiment of a method 400 that can be used to detect electrical short circuits in a fuel cell stack comprising a plurality of fuel cell assemblies. Generally, the fuel cell assemblies are electrically connected in series. The sensitivity of the method to detect electrical short circuits is adjustable. In particular, the concentration of a dilute hydrogen stream used in the method can be selected so that electrical short circuits having a resistance at or below a desired threshold value can be detected using the method.

Block 410 of method 400 comprises determining a set-point hydrogen concentration. This is a hydrogen concentration that can be used to detect an electrical short circuit having a resistance at or below the desired detectable threshold short-circuit resistance value. Examples of how the set-point hydrogen concentration can be determined are described below.

In some embodiments of method 400, block 410 is optional. For example, if a set-point hydrogen concentration has been previously determined and/or is already known, block 410 may be omitted, or may involve simply providing or selecting a suitable set-point hydrogen concentration, for example, based on the type of fuel cell assemblies that are to be tested and the desired detectable threshold short-circuit resistance value.

Block 420 of method 400 comprises supplying a dilute hydrogen stream (e.g. diluted with nitrogen or another inert gas) having a hydrogen concentration at or below the set-point reactant concentration to flow through the anodes of the fuel cell assemblies in the fuel cell stack, and supplying nitrogen to flow through the cathodes of the fuel cell assemblies in the fuel cell stack.

Block 430 of method 400 comprises measuring the open circuit voltage across each of the plurality of fuel cell assemblies while the dilute hydrogen stream, having a hydrogen concentration at or below the set-point concentration, and nitrogen are flowing through the plurality of fuel cell assemblies.

Block 440 of method 400 comprises identifying any fuel cell assemblies of the plurality of fuel cell assemblies that have an electrical short circuit based on the OCV measurements from block 430.

FIG. 5 is a flow chart illustrating an embodiment of a method 500 that can be used to detect electrical short circuits in one or more fuel cell stacks comprising a plurality of fuel cell assemblies. Generally, the fuel cell assemblies are electrically connected in series. Again the sensitivity of the method to detect electrical short circuits is adjustable. In particular, the concentration of a dilute hydrogen stream used in the method can be selected so that electrical short circuits having a resistance at or below a desired threshold value can be detected using the method.

In method 500, a first fuel cell stack comprises a calibration fuel cell assembly which is used in determining a set-point hydrogen concentration that can be used to detect an electrical short circuit having a resistance at or below the desired detectable threshold short-circuit resistance value.

Block 510 of method 500 comprises connecting a conductor having a resistance approximately equal to the desired threshold short-circuit resistance across the calibration fuel cell assembly. In other embodiments the calibration fuel cell assembly already has a known current path across it that has a resistance approximately equal to the desired detectable threshold short-circuit resistance, or is otherwise provided with such a current path across it.

Block 520 of method 500 comprises supplying a dilute hydrogen stream (e.g. diluted with nitrogen or another inert gas) to flow through the anodes of the fuel cell assemblies and the calibration fuel cell assembly in the fuel cell stack, and supplying nitrogen to flow through the cathodes of the fuel cell assemblies and the calibration fuel cell assembly in the first fuel cell stack.

Block 530 of method 500 comprises adjusting the concentration of the dilute hydrogen stream supplied to flow through the anodes of the fuel cell assemblies and the calibration fuel cell assembly in the first fuel cell stack. In some embodiments the hydrogen concentration is gradually reduced in a stepwise or continuous manner.

Block 540 of method 500 comprises measuring—at different hydrogen concentrations—the open circuit voltage across each of the plurality of fuel cell assemblies and across the calibration fuel cell assembly in the first fuel cell stack, while the dilute hydrogen stream and nitrogen are flowing through the plurality of fuel cell assemblies and through the calibration fuel cell assembly.

Block 550 of method 500 comprises determining whether, for particular hydrogen concentration, the calibration fuel cell assembly can be discriminated based on the measured open circuit voltage of the calibration fuel cell assembly and the plurality of fuel cell assemblies in the first fuel cell stack, for example, whether the measured open circuit voltage of the calibration fuel cell assembly is sufficiently differentiated from an average of the measured open circuit voltages of some or all of the plurality of fuel cell assemblies in the first fuel cell stack at the same hydrogen concentration. If not, the hydrogen concentration is adjusted (e.g. reduced) at block 530, and blocks 540 and 550 are repeated. If so, then the hydrogen concentration at which block 550 is satisfied is the set-point hydrogen concentration that can be used subsequently in method 500.

In some embodiments, block 550 can comprise determining whether or not the calibration fuel cell assembly can be discriminated based on whether its measured open circuit voltage is sufficiently differentiated from a normal or expected open circuit voltage for a "normal" fuel cell assembly of that size and design at that particular hydrogen concentration.

Block 555 of method 500 is optional and comprises identifying which (if any) of the plurality of fuel cell assemblies in the first fuel cell stack have an OCV that differs from a reference voltage (such as an average measured OCV) by more than a threshold amount or percentage. These are the fuel cell assemblies in the first fuel cell stack that have, or are indicated as having, a short circuit with a resistance equal to or lower than the desired detectable threshold short-circuit resistance.

Blocks 510 to 550 of method 500 can be used to determine a suitable set-point hydrogen concentration that can be used for subsequent testing of fuel cell stacks of a type that is the same or similar to the first fuel cell stack (e.g. in stack and cell architecture, composition and size or active area) and/or fuel cell stacks comprising fuel cell assemblies of a similar type to those in the first fuel cell stack. For example, a suitable set-point hydrogen concentration can be determined for a particular type of fuel cell stack being manufactured in a production line, and then that set-point hydrogen concentration can be used in subsequent QC testing of a plurality of such fuel stacks to identify electrical short circuits.

Thus, block 560 of method 500 comprises supplying a dilute hydrogen stream having a hydrogen concentration at or below the set-point concentration (determined at block 550) to flow through the anodes of a plurality of fuel cell assemblies in a second fuel cell stack, and supplying nitrogen to flow through the cathodes of a plurality of fuel cell assemblies in the second fuel cell stack.

Block 560 of method 500 comprises measuring the open circuit voltage across each of the plurality of fuel cell assemblies in the second fuel cell stack while the dilute hydrogen stream having a hydrogen concentration at or below the set-point concentration and nitrogen are flowing through the plurality of fuel cell assemblies in the second fuel cell stack.

Block 570 of method 500 comprises comparing the open circuit voltages measured for each of the plurality of fuel cell assemblies in the second fuel cell stack (while the dilute reactant stream having a reactant concentration at or below the set-point reactant concentration and the inert gas are flowing through the plurality of fuel cell assemblies) with a reference voltage in order to identify which, if any, of the plurality of fuel cell assemblies in the second fuel cell stack has an electrical short circuit. In some embodiments of method 500, the reference voltage is an average of the open circuit voltages of some or all of the plurality of fuel cell assemblies in the second fuel cell stack, measured at the set-point reactant concentration.

Block 590 of method 500 comprises identifying which (if any) of the plurality of fuel cell assemblies in the second fuel cell stack have OCV that differs from a reference voltage (such as an average measured OCV) by more than a threshold amount or percentage. These are the fuel cell assemblies that have, or are indicated as having, a short circuit with a resistance equal to or lower than the desired detectable threshold short-circuit resistance.

Blocks 560 to 590 may then be repeated for testing further fuel cell stacks to identify fuel cell assemblies (if any) in those stacks that have, or are indicated as having, a short circuit with a resistance equal to or lower than the desired detectable threshold short-circuit resistance.

Another way to identify which (if any) of a plurality of fuel cells in a stack have, or are indicated as having a short circuit with a resistance equal to or lower than the desired detectable threshold short-circuit resistance (e.g. at blocks 555 and/or 590 of method 500) is to determine the average deviation in the measured OCVs for the plurality of fuel cell assemblies, and identify fuel cells with measured OCVs that deviate from the average OCV by more than n times the average deviation, where n is some selected multiplier (e.g. by more than twice the average deviation). For example, if the OCVs for fuel cell assemblies in a stack are usually within a ~2 mV range, the threshold deviation can be set at ~5 mV. Other suitable methods, based at least in part on the measured OCVs, can be used to identify which (if any) of a plurality of fuel cells in a stack have, or are indicated as having a short circuit with a resistance equal to or lower than the desired detectable threshold short-circuit resistance.

FIG. 6 is a flow chart illustrating another embodiment of a method 600 that can be used to detect electrical short circuits in a fuel cell stack comprising a plurality of fuel cell assemblies. Generally, the fuel cell assemblies are electrically connected in series.

Block 610 of method 600 comprises supplying a dilute hydrogen stream having a first concentration of hydrogen to flow through the anodes of the plurality of fuel cell assemblies and supplying an inert gas to flow through the cathodes of the plurality of fuel cell assemblies in the fuel cell stack.

Block 620 of method 600 comprises measuring a first open circuit voltage across each of the plurality of fuel cell assemblies, while supplying the dilute hydrogen stream having the first concentration of hydrogen to flow through the anodes of the plurality of fuel cell assemblies and supplying an inert gas to flow through the cathodes of the plurality of fuel cell assemblies in the fuel cell stack.

Block 630 of method 600 comprises supplying a dilute hydrogen stream having a second concentration of hydrogen (different from, and in some embodiments lower than the first concentration) to flow through the anodes of the plurality of fuel cell assemblies and supplying an inert gas to flow through the cathodes of the plurality of fuel cell assemblies in the fuel cell stack.

Block 640 of method 600 comprises measuring a second open circuit voltage across each of the plurality of fuel cell assemblies, while supplying the dilute hydrogen stream having the second concentration of hydrogen to flow through the anodes of the plurality of fuel cell assemblies and supplying an inert gas to flow through the cathodes of the plurality of fuel cell assemblies in the fuel cell stack.

Block 650 of method 600 comprises, for each of the plurality of fuel cell assemblies, comparing the first open circuit voltage with the second open circuit voltage and identifying which, if any, of the plurality of fuel cell assemblies has an electrical short circuit, for example, based on the difference between the first open circuit voltage and the second open circuit voltage being greater than a threshold voltage difference.

Variants of method 600 can involve measuring and comparing the open circuit voltages of the fuel cell assemblies measured at more than two different hydrogen concentrations.

The above described embodiments of methods for detecting electrical short circuits in fuel cell stacks, can further comprise generating an output signal identifying any fuel cell assemblies in the fuel cell stack that have an electrical short circuit with a resistance lower than a desired threshold short-circuit resistance value, for example, (i) based on the open circuit voltage measured across each of the plurality of fuel cell assemblies while the dilute reactant stream having a reactant concentration at or below the set-point reactant concentration and the inert gas were flowing through the plurality of fuel cell assemblies in the fuel cell stack, or (ii) based on the change in open circuit voltage of the fuel cell assembly when the hydrogen concentration of the dilute hydrogen stream is changed from one concentration to another being greater than a threshold voltage amount.

The above described methods can be performed with or without a pressure differential across the membrane electrolyte (i.e. with or without a cathode or anode overpressure). When there is a transfer leak through the membrane in a fuel cell, for example due to pin-holes in the membrane, the fuel cell open circuit voltage depends on the anode overpressure. However, in the test methods described herein, when there is an electrical short circuit in a fuel cell, the fuel cell open circuit voltage is not significantly affected by a pressure differential and the methods can be performed with the anode and cathode pressures being essentially the same.

In the above described embodiments of methods, another suitable reactant may be used instead of hydrogen and/or the inert gas can be selected from the group consisting of nitrogen, argon, helium and carbon dioxide. In some embodiments of the test method, a dilute oxygen stream can be supplied to the cathodes and an inert gas supplied to the anodes.

Without wishing to be bound by theory, embodiments of the above described practical method for detecting an electrical short circuit in a fuel cell assembly, and the results observed, may be explained as set forth below.

When hydrogen and nitrogen are supplied to the anode and cathode of a PEM fuel cell, hydrogen will permeate from anode to cathode due to concentration gradient across the membrane. Under these conditions, based on the Nernst equation, the fuel cell potential can be expressed, for example, as follows:

$$E = -\frac{RT}{2F} \ln \frac{P_{H2,c}}{P_{H2,a}} \qquad (1)$$

where E is the fuel cell OCV, R is the ideal gas constant, T is the cell temperature, F is the Faraday constant, $P_{H2,c}$ is the partial pressure of hydrogen at the cathode, and $P_{H2,a}$ is the partial pressure of hydrogen at the anode.

The partial pressure of hydrogen at the cathode depends on the hydrogen permeation flow rate across the membrane, $Q_D$, hydrogen production rate at cathode due to a short circuit, $Q_S$, flow of nitrogen at the cathode, $Q_{N2}$, and cathode pressure, $P_e$, and can be expressed, for example, as follows:

$$P_{H2,c} = \frac{Q_D + Q_S}{Q_{N2} + Q_D + Q_S} P_c \qquad (2)$$

The method can be implemented such that the nitrogen flow rate at the cathode is significantly higher than gas crossover from anode to cathode caused by permeation and hydrogen production at the cathode due to an electrical short circuit. Under such conditions, Equation (2) can be simplified to:

$$P_{H2,c} \approx \frac{Q_D + Q_S}{Q_{N2}} P_c \qquad (3)$$

Based on Fick's law, hydrogen permeation through the membrane can be expressed as follows:

$$Q_D = aM \frac{P_{H2,a} - P_{H2,c}}{d} \qquad (4)$$

where a is the cell surface area, M is the hydrogen permeability of the membrane, and d is the membrane thickness. If a high nitrogen flow rate is being used on the cathode side, the partial pressure of hydrogen at the cathode will be significantly lower than that at the anode. As such, Equation (4) can be simplified as:

$$Q_D \approx aM \frac{P_{H2,a}}{d} \qquad (5)$$

The rate of hydrogen production at the cathode due to a short circuit, $Q_S$, can be calculated from the short circuit current, $i_s$, using the Faraday law. This current is equal to the OCV, E, over the short circuit resistance, $R_s$. The rate of hydrogen production at the cathode due to a short circuit, $Q_S$, can be expressed, for example, as follows:

$$Q_S = \frac{i_s}{2F} = \frac{E}{2FR_s} \quad (6)$$

Substituting Equations (5) and (6) in Equation (3) results in an expression for the hydrogen partial pressure at the cathode, $P_{H2,c}$, and replacing that in Equation (1) gives:

$$E \approx -\frac{RT}{2F}\ln\left[\frac{P_c}{Q_{N2}}\left(\frac{aM}{d} + \frac{E}{2FR_S P_{H2,a}}\right)\right] \quad (7)$$

In Equation (7), the first term in parenthesis (aM/d) represents hydrogen permeation through the membrane. This term does not depend on hydrogen pressure at the anode. This is because as the partial pressure of hydrogen at the anode increases, so does the hydrogen partial pressure at the cathode. Since the partial pressure of hydrogen at the cathode is much smaller than that on the anode, the two partial pressures change proportionally, and hence they do not affect the cell potential which depends on the ratio of the two, as expressed in by Equation (1).

The second term on the right-hand side of Equation (7) relates to the short circuit. This term depends on the partial pressure of hydrogen at the anode. This suggests that the anode hydrogen partial pressure can be adjusted (i.e. decreased) to make the second term large enough to be observable compared to the first term, e.g., when the resistance of the leak is large, and/or the cell size is large, both of which make the second term small compared to the first term. This is important when testing a fuel cell stack with a large surface area, and when one is interested in detecting a large contact resistance (i.e. even a relatively minor short circuit) across a fuel cell.

Thus, for a given electrical short circuit resistance across a cell, there can be a non-linear relationship between the cell potential (OCV) and the partial pressure of hydrogen at the anode. Embodiments of the methods described herein for detecting electrical short circuits exploit this non-linear relationship, because the magnitude of the reduction in cell OCV due to an electrical short circuit across the cell generally increases as the partial pressure of hydrogen at the anode is decreased. In other words, the sensitivity of the method to reveal electrical short circuits based on their effect on OCV, can be improved by using a lower hydrogen concentration in the test method.

Some acts of the methods (also referred to as blocks, elements or steps of the methods) may be performed in an order other than that which is described and illustrated herein, or may be performed in parallel with one or more other acts, or maybe be combined with one or more other acts. To the extent that some of the acts rely on the completion of other acts of the method, these may need to be performed in a particular sequence. Also, it should be appreciated that in some embodiments of the methods not all of the acts described in the flowcharts are required to be performed, that additional acts may be added, and/or that some of the illustrated acts may be substituted with other acts.

Embodiments of the systems and methods described herein can be used as a diagnostic tool for testing fuel cell assemblies. The systems and methods described herein are particularly directed towards testing solid polymer fuel cells designed for operation on air or oxygen and hydrogen, however the approach may be adapted for other types of fuel cells and/or fuel cells operating on other reactants.

It is contemplated that part of any aspect or embodiment discussed in this specification can be implemented or combined with part of other aspects or embodiments discussed in this specification.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for detecting electrical short circuits in a test fuel cell stack, said test fuel cell stack comprising a plurality of fuel cell assemblies electrically connected in series, said method comprising:
   determining a set-point reactant concentration that can be used to detect an electrical short circuit having a resistance at or below a desired threshold short-circuit resistance value;
   supplying a dilute reactant stream having a reactant concentration at or below said set-point reactant concentration to flow through said plurality of fuel cell assemblies in said test fuel cell stack;
   supplying an inert gas to flow through said plurality of fuel cell assemblies in said test fuel cell stack; and
   while said dilute reactant stream having a reactant concentration at or below said set-point reactant concentration and said inert gas are flowing through said plurality of fuel cell assemblies in said test fuel cell stack, measuring an open circuit voltage across each of said plurality of fuel cell assemblies in said test fuel cell stack,
   wherein each of said plurality of fuel cell assemblies in said test fuel cell stack comprises anode, a cathode and a membrane electrolyte interposed between said anode and cathode;
   said dilute reactant stream is a dilute hydrogen stream, and determining a set-point reactant concentration that can be used to detect an electrical short circuit having a resistance at or below a desired threshold short-circuit resistance value comprises determining a set-point hydrogen concentration;
   supplying a dilute reactant stream to flow through said plurality of fuel cell assemblies comprises supplying said dilute hydrogen stream to said anodes; and
   supplying an inert gas to flow through said plurality of fuel cell assemblies comprises supplying said inert gas stream to said cathodes.

2. The method of claim 1 wherein said test fuel cell stack comprises a calibration fuel cell assembly having a current path across it, said current path having a resistance approximately equal to said desired threshold short-circuit resistance, and wherein determining a set-point reactant concentration that can be used to detect an electrical short circuit having a resistance at or below a desired threshold short-circuit resistance value comprises:
   varying the concentration of a dilute reactant stream supplied to flow through said calibration fuel cell assembly and said plurality of fuel cell assemblies in said test fuel cell stack, and supplying an inert gas to flow through said calibration fuel cell assembly and said plurality of fuel cell assemblies in said test fuel cell stack;
   while said dilute reactant stream and said inert gas are being supplied to flow through said calibration fuel cell assembly and said plurality of fuel cell assemblies in said test fuel cell stack, measuring an open circuit voltage across said calibration fuel cell assembly and across each of said plurality of fuel cell assemblies in said test fuel cell stack;

wherein said concentration of said dilute reactant stream is varied at least until said set-point reactant concentration is reached, said set-point reactant concentration being a reactant concentration at and below which the measured open circuit voltage of said calibration fuel cell assembly is sufficiently differentiated from the measured open circuit voltages of said plurality of fuel cell assemblies in said test fuel cell stack.

3. The method of claim 2 wherein said set-point reactant concentration is a reactant concentration at and below which a measured open circuit voltage of said calibration fuel cell assembly is sufficiently differentiated from the measured open circuit voltages of said plurality of fuel cell assemblies in said test fuel cell stack by differing from an average of the open circuit voltages of the plurality of fuel cells in said test fuel cell stack measured at the set-point reactant concentration by more than a threshold amount or percentage.

4. The method of claim 2 wherein determining a set-point reactant concentration that can be used to detect an electrical short circuit having a resistance at or below a desired threshold short-circuit resistance value further comprises:
providing said current path across said calibration fuel cell assembly by connecting a conductor having a resistance approximately equal to said desired threshold short-circuit resistance across said calibration fuel cell assembly.

5. The method of claim 1 wherein determining a set-point reactant concentration that can be used to detect an electrical short circuit having a resistance at or below a desired threshold short-circuit resistance value comprises:
supplying a dilute reactant stream to flow through a calibration fuel cell assembly, and supplying an inert gas to flow through said calibration fuel cell assembly, said calibration fuel cell assembly having a current path across it, said current path having a resistance approximately equal to said desired threshold short-circuit resistance;
varying the concentration of said dilute reactant steam supplied to flow through said calibration fuel cell assembly, until said set-point reactant concentration is reached, said set-point reactant concentration reactant being a reactant concentration at and below which the measured open circuit voltage of said calibration fuel cell assembly is sufficiently differentiated from a normal open circuit voltage.

6. The method of claim 5 wherein said calibration fuel cell assembly is one of said plurality of fuel cell assemblies in said test fuel cell stack.

7. The method of claim 1 wherein said set-point reactant concentration is determined using a calibration fuel cell stack comprising a plurality of fuel cell assemblies and a calibration fuel cell assembly, said calibration fuel cell assembly having a current path across it, said current path having a resistance approximately equal to said desired threshold short-circuit resistance, and wherein determining a set-point reactant concentration that can be used to detect an electrical short circuit having a resistance at or below a desired threshold short-circuit resistance value comprises:
varying the concentration of a dilute reactant stream supplied to flow through said calibration fuel cell assembly and said plurality of fuel cell assemblies in said calibration fuel cell stack, and supplying an inert gas to flow through said calibration fuel cell assembly and said plurality of fuel cell assemblies in said calibration fuel cell stack;
while said dilute reactant stream and said inert gas are being supplied to flow through said calibration fuel cell assembly and said plurality of fuel cell assemblies in said calibration fuel cell stack, measuring the open circuit voltage across said calibration fuel cell assembly and across each of said plurality of fuel cell assemblies in said calibration fuel cell stack;
wherein said concentration of said dilute reactant stream is varied at least until said set-point reactant concentration is reached, said set-point reactant concentration being a reactant concentration at and below which the measured open circuit voltage of said calibration fuel cell assembly is sufficiently differentiated from the measured open circuit voltages of said plurality of fuel cell assemblies in said calibration fuel cell stack.

8. The method of claim 1 wherein said inert gas is selected from the group consisting of nitrogen, argon, and helium.

9. The method of claim 1 wherein said inert gas is nitrogen.

10. The method of claim 1 wherein said dilute reactant stream is supplied to flow through said plurality of fuel cell assemblies in said test fuel cell stack at a first pressure, and said inert gas is supplied to supplied to flow through said plurality of fuel cell assemblies in said test fuel cell stack at second pressure, wherein said first pressure and said second pressure are substantially the same pressure.

11. The method of claim 1 further comprising comparing said open circuit voltages measured for each of said plurality of fuel cell assemblies in said test fuel cell stack while said dilute reactant stream having a reactant concentration at or below said set-point reactant concentration and said inert gas are flowing through said plurality of fuel cell assemblies with a reference voltage in order to identify which, if any, of said plurality of fuel cell assemblies in said test fuel cell stack has an electrical short circuit.

12. The method of claim 11 wherein said reference voltage is an average of the open circuit voltages measured for each of said plurality of fuel cell assemblies in said test fuel cell stack while said dilute reactant stream having a reactant concentration at or below said set-point reactant concentration and said inert gas are flowing through said plurality of fuel cell assemblies hi said test fuel cell stack.

13. The method of claim 1 further comprising discriminating any fuel cell assemblies of said plurality of fuel cell assemblies in said test fuel cell stack that have an electrical short circuit with a resistance lower than said desired threshold short-circuit resistance value based on the open circuit voltages measured across each of said plurality of fuel cell assemblies while said dilute reactant stream having a reactant concentration at or below said set-point reactant concentration and said inert gas were flowing through said plurality of fuel cell assemblies in said test fuel cell stack.

14. The method of claim 1 further comprising generating an output signal identifying any fuel cell assemblies of said plurality of fuel cell assemblies in said test fuel cell stack that have an electrical short circuit with a resistance lower than the desired threshold short-circuit resistance value based on the open circuit voltage measured across each of said plurality of fuel cell assemblies while said dilute reactant stream having a reactant concentration at or below said set-point reactant concentration and said inert gas were flowing through said plurality of fuel cell assemblies in said test fuel cell stack.

* * * * *